US011067346B2

(12) United States Patent
Creati et al.

(10) Patent No.: US 11,067,346 B2
(45) Date of Patent: Jul. 20, 2021

(54) COOLING TOWER ADJUSTING METHOD AND SYSTEM

(71) Applicant: SEKO S.p.A., Rieti (IT)

(72) Inventors: Cristian Creati, Avezzano (IT); Luigino Esposito, Rieti (IT); Adrio Pantaleoni, Rome (IT)

(73) Assignee: SEKO S.P.A., Rieti (IT)

( * ) Notice: Subject to any disclaimer, the term of this patent is extended or adjusted under 35 U.S.C. 154(b) by 26 days.

(21) Appl. No.: 16/343,745

(22) PCT Filed: Nov. 3, 2017

(86) PCT No.: PCT/IB2017/056852
§ 371 (c)(1),
(2) Date: Apr. 19, 2019

(87) PCT Pub. No.: WO2018/083636
PCT Pub. Date: May 11, 2018

(65) Prior Publication Data
US 2019/0277586 A1 Sep. 12, 2019

(30) Foreign Application Priority Data

Nov. 3, 2016 (IT) .......................... 102016000110609

(51) Int. Cl.
*G05D 9/12* (2006.01)
*F28F 25/00* (2006.01)
(Continued)

(52) U.S. Cl.
CPC .............. *F28F 27/003* (2013.01); *G01F 1/58* (2013.01); *G05D 9/12* (2013.01);
(Continued)

(58) Field of Classification Search
CPC .... F28F 27/003; G01F 1/58; F28C 2001/006; F28C 2025/005; Y10T 137/7313; G05D 9/12
See application file for complete search history.

(56) References Cited

U.S. PATENT DOCUMENTS 2,828,761 A    4/1958  Weibert, Jr.
3,915,187 A *  10/1975 McCalla .............. C02F 1/686
                                                137/101.27
(Continued)

OTHER PUBLICATIONS

Written Opinion and International Search Report for related application PCT/IB2017/056852, dated Feb. 19, 2018; 9 pages.

*Primary Examiner* — William M McCalister
(74) *Attorney, Agent, or Firm* — Loza & Loza, LLP

(57) ABSTRACT

An adjusting method to adjust the liquid discharge operation from a collection tank of a cooling tower, comprising the steps of: checking an activation signal of a discharge solenoid valve (EV) of the tank; detecting a flow value of the liquid flowing between an inlet mouth and a discharge mouth of the collection tank to allow a discharge operation of the liquid contained in the tank, wherein said discharge operation is allowed in correspondence of a detection of a flow rate value of the liquid flowing between an inlet mouth and a discharge mouth of the collection tank at least equal to a reference threshold value and wherein said discharge operation is inhibited in correspondence of a detection of the liquid flow rate value that is null or lower than said reference threshold value.

18 Claims, 3 Drawing Sheets

(51) Int. Cl.
*F28F 27/00* (2006.01)
*G01F 1/58* (2006.01)
*F28C 1/00* (2006.01)

(52) U.S. Cl.
CPC ... *F28C 2001/006* (2013.01); *F28F 2025/005* (2013.01); *Y10T 137/7313* (2015.04)

(56) References Cited

U.S. PATENT DOCUMENTS

| | | | | |
|---|---|---|---|---|
| 4,563,274 A * | 1/1986 | Rothon | ............ | B01D 17/0214 210/101 |
| 5,084,217 A | 1/1992 | Dodds | | |
| 5,121,768 A * | 6/1992 | Thompson | ............ | F24F 5/0035 137/312 |
| 5,121,770 A * | 6/1992 | Thompson | ............ | F24F 5/0035 137/312 |
| 5,294,916 A * | 3/1994 | Bolton | ............ | B01D 1/0082 137/392 |
| 5,313,964 A * | 5/1994 | Dausch | ............ | A47L 15/4244 134/57 D |
| 5,339,854 A * | 8/1994 | Leith | ............ | G05D 9/12 137/101.25 |
| 5,383,574 A * | 1/1995 | Raphael | ............ | B67D 1/1245 137/205 |
| 6,125,647 A * | 10/2000 | Martinez | ............ | F24F 13/222 62/304 |
| 8,065,759 B2 * | 11/2011 | Smushkovich | ............ | E03C 1/242 4/669 |
| 2011/0226351 A1* | 9/2011 | Hwang | ............ | F16K 31/26 137/446 |
| 2013/0218483 A1 | 8/2013 | Sawyer | | |
| 2016/0153718 A1 | 6/2016 | Batscha et al. | | |
| 2016/0291609 A1* | 10/2016 | Lucas | ............ | C09K 8/62 |

* cited by examiner

COOLING TOWER ADJUSTING METHOD AND SYSTEM

The present invention refers to a method and a system for adjusting the parameters of a fluid in a hydraulic circuit, in particular a method and a system for adjusting a conductivity and chemical product value contained in the water flowing in the hydraulic circuit of a cooling tower.

Most industrial processes involving thermal cycles, such as industrial plants or air conditioning systems, have cooling systems in which the liquid (water) used for cooling is caused to drop in correspondence of an upper part of a cooling tower or evaporation tower. Hence, the cooling tower comprises an upper fall portion from which the cooling water falls and a lower collection tank. A ventilation system is also provided which generates an air flow in the water fall zone so as to allow the liquid phase, during the fall, to transfer energy to a gaseous phase thus reducing its own temperature. In fact, water cooling is obtained favoring the evaporation of a small amount of the water itself.

Falling water is obviously recovered in the collection tank and put back in circulation in the cooling system through a water distribution hydraulic circuit.

The loss of evaporated water is compensated with replenishment water which is fed from the outside into the collection tank. Just because of evaporation, in the hydraulic circuit salts contained in the water are concentrated, thus a step of draining or discharging ("blow down") the water of the cooling circuit. Therefore, reintegration water must compensate in volumetric terms both evaporation and draining so as to maintain constant the quantity of water in the cooling system.

Regardless of the size of the plant and of the evaporation tower, the water flowing in the hydraulic circuit must maintain constant parameters, for instance in terms of conductivity, chlorine percentage and pH, so as to ensure an optimal operation of the plant avoiding the risk of deposit formation and corrosion phenomena in the pipes or in correspondence of the inlet/outlet sections of the replenishment water.

Moreover, it is necessary to guarantee a residual disinfectant value in the water to limit the risk of formation of algae or microorganisms.

In the prior art, the use of dosing pumps is provided for introducing into the hydraulic circuit chemical agents for adjusting some parameters of the cooling water, for instance pH and/or chlorine percentage. The dosing pumps which are used are usually automatic and controlled by a centralized electronic control unit. The electronic control unit collects data concerning the actual presence of water in correspondence with a so-called "hydraulic module", i.e. the module in which detection probes are present.

Adjustment of chemical parameters occurs through the activation of a dosing pump, in particular one pump for each product to be dosed.

Differently, adjustment of conductivity occurs through operations of discharge ("blow down") and replenishment of liquid (water) in the cooling tower until the conductivity value falls within the parameters allowed by the system.

In prior art systems, the discharge operation must be completed within a preset period of time, and the control of the discharge operations is carried out in relation to the time duration of the discharge itself. In the case where the discharge time is longer than the preset duration, an anomaly is signalled to the adjusting system and the "blow down" process is interrupted. An example of a prior art system is described in document U.S. Pat. No. 5,084,217.

A disadvantage of the prior art systems is that in case of malfunction, for instance in case of deposits, dirt or problems of opening of a solenoid valve, an actual outflow could not correspond to a discharge signal, with consequent damages to the system.

Similar problems could obviously occur for inflow, for instance a replenishment signal could not correspond to an actual inflow of water.

Failure to replenish, especially if prolonged over time, causes damages to the plant and related high maintenance costs due to phenomena of deposit, corrosion, microorganisms and suspended solids in the hydraulic circuit.

A further disadvantage of the prior art systems is that in correspondence of a discharge interruption, all dosages are interrupted, for instance also those of the devices dosing products for adjusting pH and chlorine in the cooling water.

Therefore, the technical problem posed and solved by the present invention is to provide an adjusting method and system allowing to overcome the drawbacks mentioned above with reference to the prior art.

This problem is solved by a method and, according to the same inventive concept, a system according to the independent method and system claims, respectively.

Preferred features of the present invention are present in the dependent claims thereof.

Advantageously, the method of the present invention allows in a simple, reliable, efficient and inexpensive way to drastically reduce the possibilities of error in adjusting a discharge operation in a hydraulic circuit of a cooling tower.

Also, advantageously, the method of the present invention allows to automatically adjust the time duration of the discharge operation.

A further advantage of the method according to the present invention is that it allows an automatic control of the dispensing devices, reducing the need for control by an external operator.

An even further advantage is that the operation of dispensing chemical products in the collection tank, i.e. the introduction of the product amount necessary for the correct operation of the cooling tower, allows to reduce the risks deriving from an incorrect concentration of chemical product.

A still further advantage of the method according to the present invention is the possibility of preserving the integrity of the hydraulic circuit and reducing the need for manual maintenance interventions, thus reducing the process costs and avoiding the possibility of damages to the environment and/or to the plant itself.

Other advantages, features and modes of use of the present invention will be evident from the following detailed description of some embodiments, illustrate by way of example and not by way of limitation.

The present invention will be now described, by way of illustration and not by way of limitation, according to its preferred embodiments, by particularly referring to the Figures of the annexed drawing, in which.

Figure 1:
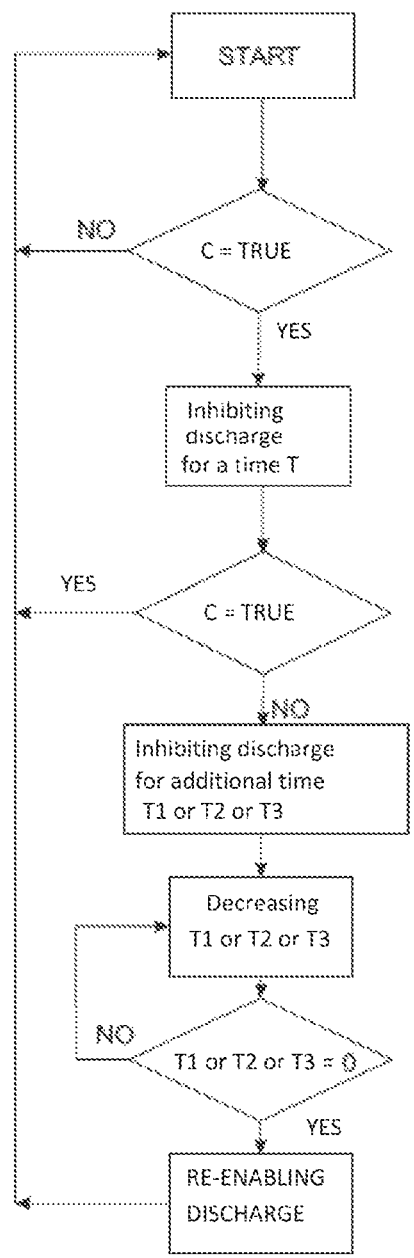
FIG. 1 shows a flowchart of an embodiment of the method according to the present invention.

As shown in the flowchart schematically represented in FIG. 1, a preferred embodiment of the method according to the present invention comprises a step of checking a condition of activation of a discharge solenoid valve EV positioned downstream of the collection tank of the cooling tower (step indicated in FIG. 1 with START).

The adjusting method according to the present invention also comprises a step of detecting a flow rate of liquid flowing between an inlet mouth and a discharge mouth of the collection tank of the cooling tower. For the purposes of the present description, the fluid involved in the replenishment process of the evaporative tower is particularly considered, therefore the incoming fluid that is introduced into the collection tank and the outgoing fluid that is discharged from the collection tank are considered flowing through the collection tank. The same fluid that is contained within the tank and that is analysed, as will be better described later, by probes present in the hydraulic module (in order to check its chemical parameters, such as conductivity) is also considered as flowing fluid, wherein the liquid flow is checked by a sensor F1.

Figure 3:
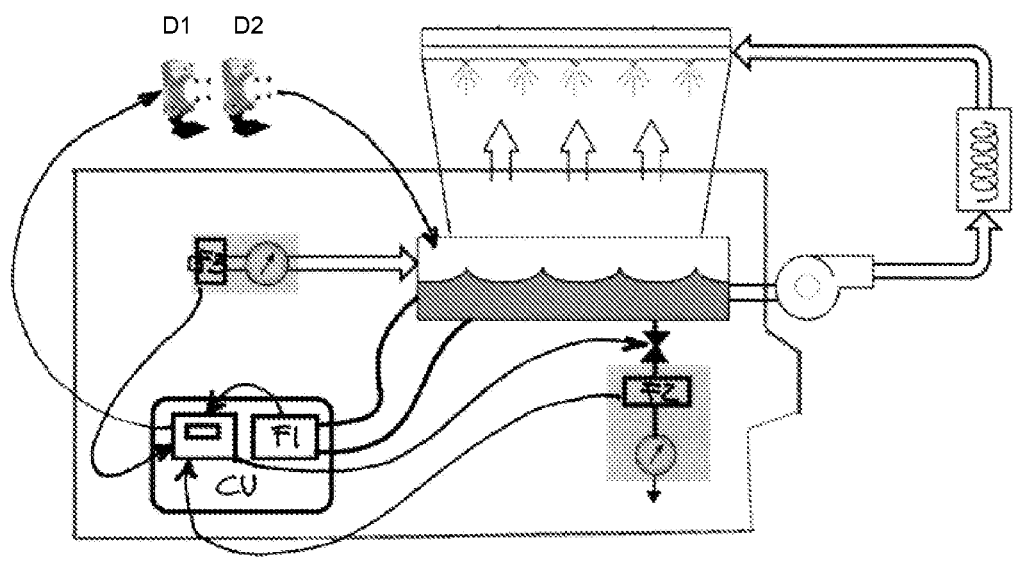
FIG. 3 shows a schematic representation of an adjusting system configured to perform an embodiment of the method according to the present invention.

In an embodiment of the method according to the present invention (schematically represented in FIG. 1) in correspondence with a detection of a flow rate value of liquid flowing between an inlet mouth and a discharge mouth of the collection tank (for instance measured through one of the sensors F1, F2 or F3 shown in FIG. 3) at least equal to a preset reference threshold value, the discharge operation is allowed. Otherwise, in the case where a flow rate value of liquid flowing between an inlet mouth and a discharge mouth of the collection tank is detected as equal to zero or in any case lower than the preset threshold value, the discharge operation is inhibited.

In a further embodiment of the method according to the present invention (schematically represented in FIG. 2) in correspondence of a detection of a flow rate value of liquid flowing between an inlet mouth and a discharge mouth of the collection tank (for instance measured through one of the sensors F1, F2 or F3 shown in FIG. 3) at least equal to a preset reference threshold value, the discharge operation is allowed. Otherwise, in the case where a flow rate value of liquid flowing between an inlet mouth and a discharge mouth of the collection tank is detected as equal to zero or in any case lower than the preset threshold value, the discharge operation is inhibited and at the same the dispensing of chemical product inside the collection tank is inhibited as well.

The flow rate values which are detected (respectively through the sensors F1, F2 and F3, shown in FIG. 3) are compared with respective preset threshold values.

For instance, depending on the specific needs and characteristics of the plant, the preset threshold values can be changed.

In correspondence of a detection of a flow rate value of liquid entering and/or exiting from the collection tank at least equal to a preset reference threshold value, the discharge operation is permitted. Otherwise, in the case where a flow rate value of liquid entering and/or exiting from the collection tank is detected as equal to zero or in any case lower than the preset threshold value, the discharge operation is inhibited.

In particular, the step of inhibiting discharge (and of inhibiting the chemical product dispensing, in the further embodiment) has a time duration equal to a time (T) of restoration of the liquid flow rate value in the collection tank of the cooling tower, plus a time of additional inhibition (T2; T3) characteristic of sensor devices used for detecting the value of said liquid flow rates, as will be detailed later.

Preferably, the inhibiting step includes processing a digital signal. In an alternative embodiment, the inhibiting step can be activated manually by an operator, for instance in conditions of recirculation system stall or error of a plant control unit.

FIG. 3 shows an adjusting system comprising detecting devices F1, F2, F3 configured to detect respective flow rates of liquid flowing through the collection tank, devices D1, D2 for dispensing a chemical product, a solenoid valve (EV) for discharging the cooling liquid ("blow down"), and a central processing unit (CU) configured to perform the method according to the invention.

Advantageously, the described method allows to diversify the actions on the basis of the cause of the problem detected by using the sensor devices.

In a preferred embodiment of the system according to the present invention, the sensor devices comprise a sensor F1 which is preferably positioned in correspondence of the control unit. In particular, the sensor F1 is a flow based switch, i.e. a boolean indicator of water flow level, made with magnetic contact and a hydraulic flow regulator present in the hydraulic module. This sensor allows to detect a water flow value within the hydraulic module and therefore to guarantee, through a signal that is transmitted to the control unit, the comparison of the detected value with the preset value suitable to guarantee correct measurements of the parameters of the water in the cooling tower.

In particular, the flow based switch F1 is functional to the validity of the chemical parameters detected and to the measurements carried out in the plant. Therefore, in the case where a flow rate problem is detected through F1, in the embodiment schematically represented in FIG. 1, the measurement of detected conductivity could not be consistent with the tank conductivity value and the discharge operation is therefore inhibited.

Figure 2:
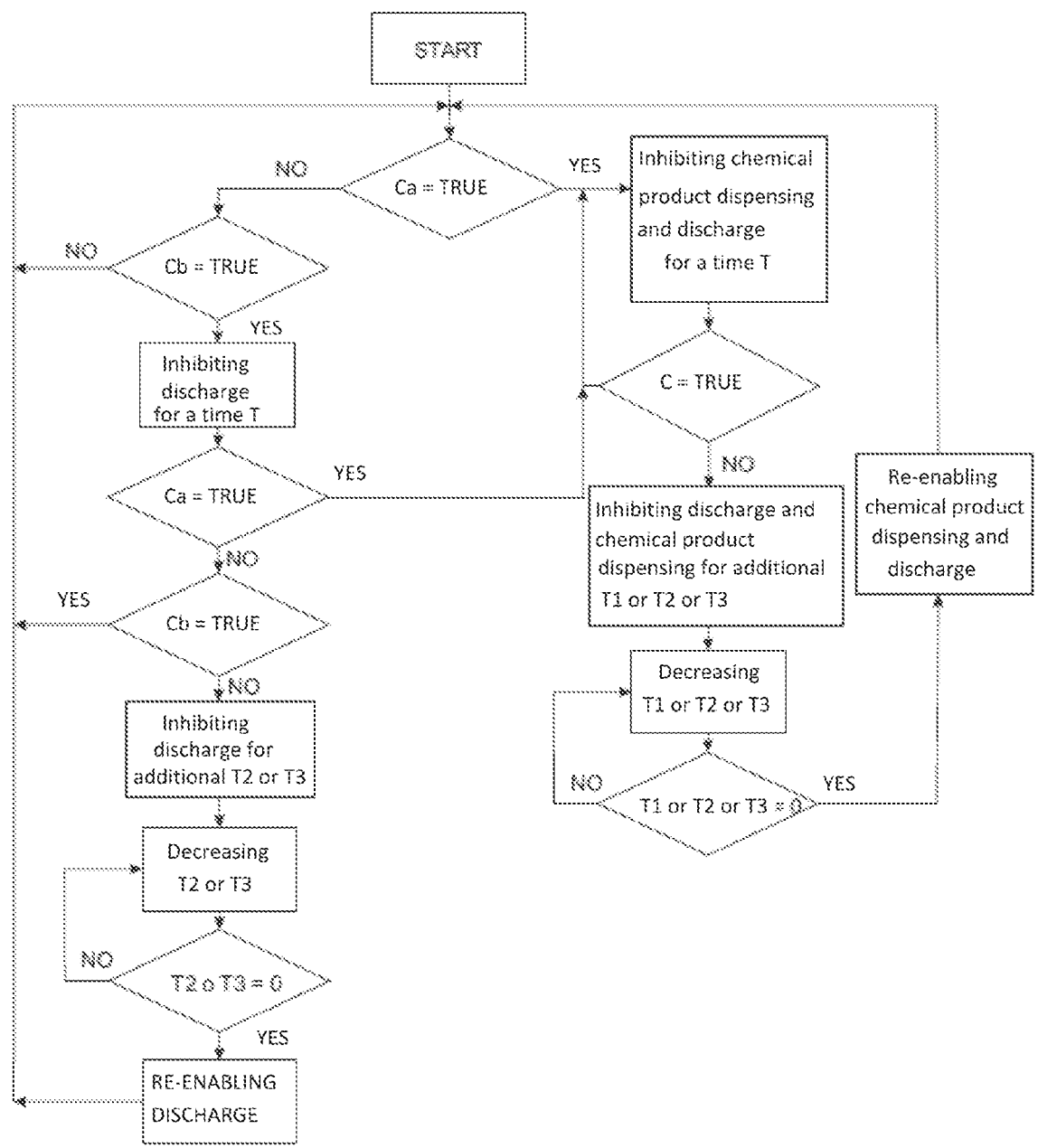
FIG. 2 shows a flowchart of a further embodiment of the method according to the present invention.

In the further embodiment schematically represented in FIG. 2, in the case where a flow rate problem is detected through F1, both the operations of discharge of the liquid contained in the tank and all dosages of the chemical products are inhibited.

The sensor devices also comprise a further flow sensor F2 positioned or positionable in correspondence of a duct of discharge of water from the collection tank, in particular downstream of the discharge solenoid valve EV. For instance, the further sensor F2 is a flow meter, in particular a rotary vane flow meter. In general, this type of sensor allows to carry out a measurement of the actual water discharge flow exiting from the collection tank. The further sensor F2 is positioned so as to detect the exact flow rate of the water that is actually discharged upon activation of the solenoid valve and whether the solenoid valve is causing at least a determined instant water amount, set by the operator, to flow. In this way, through a signal that is transmitted to the control unit CU, it is checked whether the discharge solenoid valve is actually operating or turned off or operating at reduced flow rate (through a comparison with a flow value preset by an operator).

Moreover, said sensor devices comprise a still further sensor F3 preferably positioned upstream of a duct for replenishing water in the collection tank. In particular, the still further sensor F3 is a flow meter, i.e. a water instant flow rate meter, for instance a rotary vane flow meter. In this way, through a still further signal that is transmitted to the CU control unit, a value of the overall flow rate of water flowing in the collection tank of the cooling tower is measured.

Advantageously, the flow meter F3 has a dual improving effect on the management of a cooling tower. First of all, the inhibition of a discharge ("blow down") operation in the absence of an adequate flow of replenishment water prevents the water level in the tower from dropping below the system minimum operating values. Also, the flow sensor—unlike a level probe that would detect the error only in correspondence of a significant variation on the level in the tank—checks in real time whether the flow rate value is compliant or not, therefore allowing to quickly detect possible anomalies.

Moreover, by measuring the amount of replenishment water (entering the collection tank) and comparing it with the measured flow rate value in correspondence of the discharge duct (at the outlet of the collection tank), the system can be recalibrated in real time. In fact, through an appropriate adjustment of the discharge time, the system can be operated even in the case where the flow rate value of the incoming water is lower than the flow rate value in correspondence of the discharge.

The discharge operation is completed when the water conductivity returns within acceptable values.

In fact, the discharge water is characterized by a high conductivity value, and the replenishment brings low conductivity water into the cooling tower. The control of the replenishment water advantageously allows to proceed with a discharge operation without alarms even if the flow rate of the low conductivity water is not high (or comparable to the discharge one). Under these conditions, a longer time will just be awaited for the replenishment.

As shown in FIG. 1, the inhibition step has a time duration at least equal to the time T at which there is an alarm (or error condition) related to a specific sensor and, in particular, the discharge operation of the liquid contained in the collection tank is inhibited for an additional time the duration of which depends on the type of sensor that is checked first, as will be better specified later.

In an alternative embodiment, the additional time duration depends on the type of the specific sensor which has first generated the error condition.

Advantageously, each one of the above described sensors can generate an event, for instance an error condition, to inhibit the discharge operation (in particular, in the further embodiment schematically represented in FIG. 2, F1 also inhibits the dosage of chemical agent inside the collection tank of the cooling tower).

For instance, ERR1 indicates the occurrence of an error condition generated by the sensor F1, therefore ERR1=TRUE if the flow detected by the sensor F1 is below a preset value. In particular, an error condition of sensor F1 comprises a detection of the position of a float present in the hydraulic module below a preset minimum position (equal to a preset minimum flow value). T1 indicates the additional time of discharge operation inhibition and of the dispensing of chemical product related to the specific sensor F1, for instance equal to the time necessary to the plant to restore the steady state conditions in correspondence of sensor F1, or for instance equal to the time necessary to the sensor F1 to pass from a startup configuration to an operational configuration.

The operation of discharging the water contained within the tank of the cooling tower is therefore inhibited for a time T (equal to the duration of the error condition) plus an additional time T1 (characteristic of the specific sensor) starting from the time at which the sensor F1 returns from an alarm or error condition.

ERR2 indicates an error condition generated by sensor F2, for instance ERR2=TRUE if the flow detected by sensor F2 is below a preset value. In particular, an error condition of sensor F2 comprises a detection of a determined reference value of the liquid flow (preset minimum value, so-called setpoint). T2 indicates the additional time of inhibition of the discharge operation related to the specific sensor F2, for instance equal to the time necessary to the plant to restore the steady state conditions in correspondence of sensor F2, or for example equal to the time necessary to sensor F2 to pass from a startup configuration to an operational configuration.

The operation of discharging the water contained in the tank of the cooling tower is therefore inhibited for a time T (equal to the duration of the error condition) plus an additional time T2 (characteristic of the specific sensor) starting from the time at which the sensor F2 returns from an alarm or error condition.

ERR3 indicates an error condition generated by sensor F3, for instance ERR3=TRUE if the liquid flow detected by sensor F3 is lower than a determined reference liquid flow value (preset minimum value, so-called setpoint). T3 indicates the additional time of inhibition of the discharge operation related to the specific sensor F3, for instance equal to the time necessary to the plant to restore the steady state conditions in correspondence of sensor F3, or for instance equal to the time necessary to sensor F3 to pass from a startup configuration to an operational configuration.

The operation of discharging the water contained inside the tank of the cooling tower is therefore inhibited for a time T (equal to the duration of the error condition) plus an additional time T3 (characteristic of the specific sensor) starting from the time at which the sensor F3 returns from an alarm or error condition.

Advantageously, said sensor devices (F1, F2, F3) are continuously monitored to check whether at least one of the sensors is in an error condition.

An alternative embodiment provides for a discontinuous monitoring of the sensor devices, for example a monitoring with predetermined time frequency.

Through the step of monitoring the sensor devices, the relationship C=ERR1 OR ERR2 OR ERR3 is therefore checked, which condition is shown in FIG. 1.

In the general case where an error condition occurs even for only one of the sensors, then the relationship C is true and, as shown in the flow chart of FIG. 1, the control unit interrupts the process of discharging the water contained in the tank of the cooling tower and signals, for instance by the activation of luminous and/or sound devices, the existence of an alarm condition. Such alarm condition persists as long as said relationship C is true.

In particular, as shown in FIG. 2, if the error condition is detected on sensor F2 or F3, the blow down process is interrupted, but the process of dosing chemical products can be not interrupted being bound to the absence of error on sensor F1.

A further preferred embodiment of the method according to the present invention provides for a differentiated monitoring of the individual sensors and therefore, in addition to said relationship C, the relationships Ca=ERR1 and Cb=ERR2 or ERR3 are checked, as shown in FIG. 2.

Advantageously, a differentiated check of the possible error conditions of the individual sensors allows an inhibition of the discharge operation independent from the dispensing of the chemical products in the collection tank.

As shown in FIG. 2, a further embodiment of the method according to the invention comprises a check of the relationship Ca=ERR1 immediately after that an activation of the discharge solenoid valve EV has been check. In the case where sensor F1 does not detect any error conditions, a check of the relationship Cb=ERR2 or ERR3 is carried out. Advantageously, in the latter case, in correspondence of a condition Cb=TRUE, the method according to the invention provides for the inhibition of the discharge operation only. Hence, similarly to what has been said above, the operation of discharging the water contained inside the tank of the cooling tower is therefore inhibited for a time T (equal to the duration of the error condition) plus an additional time T2 or T3 (characteristic of the specific sensor) starting from the time at which sensor F2 or F3 returns from an alarm or error condition.

In all the embodiments, from the moment at which the error condition of each sensor is corrected and hence the correct operation of the circulation system is restored, that is to say from the moment at which said relationship C is false, the inhibition of the discharge operation lasts for an additional time T1, T2 or T3, characteristic of the sensor that is considered to be more characterizing for the correct operation of the cooling tower and that is first checked in said relationship C, or in said relationship Cb.

For example, in the above case the possible error condition that is first checked is ERR1, i.e. the error condition of sensor F1, thus the inhibition of the discharge operation will be maintained for a time T plus a time T1 characteristic of the specific sensor F1.

In an alternative embodiment, the method according to the present invention provides for the check of sensor F3 before a check of sensor F1. Therefore, in this case the relationship C=ERR3 OR ERR2 OR ERR1 is checked, hence the inhibition of the dosage will be maintained for a time T plus a time T3 characteristic of the specific sensor F3.

The possible correlations can be obviously multiple to adapt to different cases and specific plant needs.

Discriminating the additional inhibition times T1, T2 or T3, characteristic of a specific sensor, can be very useful because, depending on the point of the plant in which the flow problem occurs, it may be necessary to wait a longer or shorter time before returning to a steady state condition.

The characteristic of possibly configuring the times T1, T2, and T3 advantageously allows an optimisation of the restoration times of the cooling tower following, for instance, a voluntary shutdown or an unexpected block.

In fact, depending on the specific plant needs, it is possible to configure the sensors F1, F2, F3 so that they have the same value of restoration time T1, T2, T3 or, alternatively, to set a different restoration value for each sensor.

A check of the error condition of the sensor having the longest restoration time is convenient in the case where it is desired to work in safe conditions and to ensure that the whole plant is in steady state at the moment when the inhibited operation is restored, for instance in large plants with very high inertia. Alternatively, a check of the error condition of the sensor having the shortest restoration time is convenient where it is desired to work in conditions of rapid restoration of the plant steady state conditions, for instance in evaporative towers with small size tanks where the system can be restored faster.

Then, the adjusting method according to the present invention has a step of decreasing the additional inhibition time and in correspondence of a zero value of such additional time, the operations of dispensing chemical products and/or of discharging water from the collection tank are re-enabled.

Therefore, if the liquid flow in a cooling tower is interrupted or decreased for any reason (for example due to a fault, a malfunction of a circulation pump, or simply the shutdown of the cooling tower in non-use conditions), also the dispensing of the chemical products is interrupted, and then it automatically resumes (although the possibility of a manual resumption is not excluded) after a restoration time adjustable according to the specific dimensional characteristics of the plant.

In this way, advantageously, even in case of malfunction, the optimum and strictly necessary chemical product dispensing is always guaranteed, hence neither higher nor lower than the quantity required for an efficient operation of the circulation system of a cooling tower.

The present invention also comprises an implementation of the described method through a computer program.

Advantageously, the computer program can be stored in a memory medium, for instance readable through a programmable electronic device.

Moreover, the computer program can be implemented by developing a software that can be supported by any programmable electronic device.

Some examples of embodiments are described in the following:

FIRST EXAMPLE

The discharge water flow rate value is equal to 1000 litres per minute and a replenishment water flow rate value is equal to 1000 litres per minute, while high conductivity water is discharged there is an equivalent replenishment with low conductivity water and in a determined time (depending on the size of the tank of the cooling tower) the discharge process will be completed without errors.

SECOND EXAMPLE

The discharge water flow rate value is equal to 1000 litres per minute and a replenishment water flow rate value is equal to 500 litres per minute, it will take a longer time to ensure that the water in the tower is brought back to adequate conductivity levels.

THIRD EXAMPLE

The discharge water flow rate value is equal to 1000 litres per minute and a replenishment water flow rate value is zero or too low (for instance 10 litres per minute), there is the risk of not succeeding in counteracting the lack of water due to the discharge because of the insufficient replenishment flow.

Advantageously, by introducing a control on the allowable minimum value for the replenishment or correlating it with the discharge flow value, it is possible to intercept error conditions and to inhibit the discharge.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. An adjusting method to adjust a liquid discharge operation from a collection tank of a cooling tower, comprising the steps of:
checking an activation signal of a discharge solenoid valve of the tank;
detecting a flow rate value of a liquid flowing between an inlet mouth and a discharge mouth of the collection tank to allow a discharge operation of the liquid contained in the tank,
wherein said discharge operation is allowed in correspondence of a detection of said flow rate value at least equal to a reference threshold value and wherein said discharge operation is inhibited in correspondence of a detection of said flow rate value that is null or lower than said reference threshold value.

2. The adjusting method according to claim 1, wherein said detecting step comprises detection of said flow rate value in correspondence of said inlet mouth of the collection tank.

3. The adjusting method according to claim 1, wherein said discharge operation is inhibited for a time duration equal to a restoration time of said flow rate value, plus an additional inhibition time associated to one or more detecting sensor devices configured to detect said flow rate value.

4. The adjusting method according to claim 3, wherein said discharge operation is inhibited for a time duration equal to the longest one out of two or more additional inhibition time values associated to two or more sensor devices detecting said flow rate value.

5. The adjusting method according to claim 3, wherein said inhibition step has a time duration equal to the shortest one of said additional inhibition time values characteristic of sensors devices detecting said flow rate value.

6. The adjusting method according to claim 3, wherein said restoration time is equal to the duration of an error condition of at least one of said sensor devices.

7. The adjusting method according to claim 3, wherein in correspondence of a value of said additional inhibition time equal to zero, said discharge operation is reactivated.

8. The adjusting method according to claim 1, wherein said detecting step comprises processing at least one boolean signal.

9. The adjusting method according to claim 1, wherein said discharge operation can be mechanically inhibited.

10. An adjusting system comprising:
sensor devices configured to detect a flow rate value of a liquid in a hydraulic circuit of a cooling tower;
a solenoid valve positioned or positionable downstream of a collection tank to allow a discharge operation of the liquid;
a processing unit configured to perform an adjusting method to adjust the discharge operation of the liquid from the collection tank, comprising the steps of:
checking an activation signal of the discharge solenoid valve of the tank;
detecting said flow rate value of the liquid flowing between an inlet mouth and a discharge mouth of the collection tank to allow a discharge operation of the liquid contained in the tank,
wherein said discharge operation is allowed in correspondence of a detection of said flow rate value at least equal to a reference threshold value and wherein said discharge operation is inhibited in correspondence of a detection of said flow rate value that is null or lower than said reference threshold value,
wherein said solenoid valve is controlled through a signal transmitted by said processing unit so as to inhibit the discharge operation, for a defined period of time, in correspondence of an error condition of said sensor devices.

11. The adjusting system according to claim 10, wherein said discharge operation is inhibited for a time duration equal to a restoration time of said flow rate value, plus an additional inhibition time associated to one or more detecting sensor devices configured to detect said flow rate value.

12. The adjusting system according to claim 11, wherein said discharge operation is inhibited for a time duration equal to the longest one out of two or more additional inhibition time values associated to two or more sensor devices detecting said flow rate value.

13. The adjusting system according to claim 11, wherein said inhibition step has a time duration equal to the shortest one of said additional inhibition time values characteristic of sensors devices detecting said flow rate value.

14. The adjusting system according to claim 11, wherein said restoration time is equal to the duration of an error condition of at least one of said sensor devices.

15. The adjusting system according to claim 11, wherein in correspondence of a value of said additional inhibition time equal to zero, said discharge operation is reactivated.

16. A computer readable medium storing instructions which, when executed by a processing unit, cause said processing unit to perform an adjusting method to adjust the liquid discharge operation from a collection tank of a cooling tower, comprising the steps of:
checking an activation signal of a discharge solenoid valve of the tank;
detecting a flow value of a liquid flowing between an inlet mouth and a discharge mouth of the collection tank to allow a discharge operation of the liquid contained in the tank,
wherein said discharge operation is allowed in correspondence of a detection of said flow rate value at least equal to a reference threshold value and wherein said discharge operation is inhibited in correspondence of a detection of said flow rate value that is null or lower than said reference threshold value.

17. The computer readable medium according to claim 16, wherein said discharge operation is inhibited for a time duration equal to a restoration time of said flow rate value, plus an additional inhibition time associated to one or more detecting sensor devices configured to detect said flow rate value.

18. The computer readable medium according to claim 17, wherein in correspondence of a value of said additional inhibition time equal to zero, said discharge operation is reactivated.

* * * * *